United States Patent [19]

Segoshi et al.

[11] Patent Number: 4,953,966
[45] Date of Patent: Sep. 4, 1990

[54] SPECTACLE FRAME

[75] Inventors: Kazuo Segoshi; Toshiyuki Okuda; Kenji Okamura; Mizuo Yoshida, all of Fukui, Japan

[73] Assignee: Sigma Co., Ltd., Fukui, Japan

[21] Appl. No.: 294,192

[22] Filed: Jan. 6, 1989

[51] Int. Cl.⁵ .............................................. G02C 1/00
[52] U.S. Cl. ........................................ 351/41; 351/86
[58] Field of Search .................. 351/41, 86, 158, 103, 351/114, 124, 126, 128, 154

[56] References Cited

U.S. PATENT DOCUMENTS 4,772,112 9/1988 Zider ..................................... 351/41

FOREIGN PATENT DOCUMENTS 0089716 7/1981 Japan ..................................... 351/41
8502688 6/1985 PCT Int'l Appl. ..................... 351/41

Primary Examiner—Rodney B. Bovernick
Attorney, Agent, or Firm—Kenyon & Kenyon

[57] ABSTRACT

A spectacle frame comprises a face-contacting portion such as a side and a lens-fixing portion such as a rim, both the portions being made of a shape memory alloy, and connecting members to be connected with the face-contacting portion and the lens-fixing portion. The connecting member is made of a titanium alloy, preferably β-phase. The face-contacting portion and the lens-fixing portion are soldered to the connecting member with a palladium-based soldering material.

3 Claims, 3 Drawing Sheets

| (A) NAME OF PARTS | (B) MAIN MACHINING PROCESSES | (C) POSSIBLE USE OF NICKEL-TITANIUM | (D) COMBINATION OF PARTS FOR SOLDERING | | | | | | | |
|---|---|---|---|---|---|---|---|---|---|---|
| | | | SIDE | STUD CASE | BRIDGE | BROW LUG | RAD ARM | JOINT | LUG | |
| RIM | STAMPING, ROLLING, BENDING, CUTTING | YES | × | × | NT-NT βTi-NT NT-NiCr | NT-NiCr NT-Ti NT-βTi | NT-NiCr NT-Ti NT-βTi | × | NT-NT NT-Ti NT-βTi | |
| LUG | CUTTING, SWAGING, COLD FORGING, BENDING | YES | × | × | × | NT-NiCr NT-Ti NT-βTi | × | NT-NiCr NT-Ti NT-βTi | | |
| JOINT | CUTTING, STAMPING, ROLLING, DRILLING, TAPPING, | NO | βTi-NT NiCr-NT Ti-NT | × | × | × | × | | | |
| PAD ARM | CUTTING, BENDING | YES | × | NT-NiCr NT-Ti NT-βTi | × | × | | | | |
| BROW LUG | STAMPING, ROLLING, CUTTING, DRILLING, TAPPING | NO | × | × | × | | | | | |
| BRIDGE | CUTTING, SWAGING, COLD FORGING | YES | × | × | | | | | | |
| STUD CASE | STAMPING, DRAW STAMPING, DRILLING, TAPPING | NO | × | | | | | | | |
| SIDE | CUTTING, SWAGING, COLD FORGING | YES | | | | | | | | |

FIG. 2

SPECTACLE FRAME

FIELD OF THE INVENTION

The present invention relates to a spectacle frame and, more particularly, to a spectacle frame in which a shape memory alloy material (hereafter referred to as an NT alloy material) is used for face-contacting parts such as sides and lens-fixing parts such as a rim.

BACKGROUND OF THE INVENTION

It is desirable that an optimally designed SM alloy material is used for face-contacting parts such as sides for fitting comfortably with the user's head portions to which the spectacle frame is applied, as well as lens-fixing parts such as a rim. On the other hand, a member for connecting such members needs to be provided with boring, tapping, cutting and other similar machining operations, so that it is necessary to use for such members a metal which allows such machining operations to be performed readily. In addition, these members need to be soldered, and it is necessary to give due consideration to a soldering material to be used.

A soldering material which meets the above-described conditions is disclosed in Japanese Patent Application No. 104808/1987. With respect to a spectacle frame disclosed in this application, an NT alloy material is used as major members, and a nickel-chromium alloy (hereafter referred to as a NiCr alloy) is used for portions which require machining. Furthermore, such members are soldered with a palladium-based soldering material (hereafter referred to as a Pd material).

Although such a conventional spectacle frame has had generally acceptable characteristics, there has been drawbacks in that the soldering material fails to flow smoothly in the soldering process and that it is not well suited to plating.

OBJECTS OF THE INVENTION

Accordingly, an object of the present invention is to provide a spectacle frame which is sturdy, fits comfortably with the user's head portion to which the spectacle frame is applied, overcomes the faulty flow of solder, allows plating to be effected positively, does not require an undue force in the fitting of a lens, and has a unique texture using a titanium alloy, particularly, $\beta$-phase titanium alloy, instead of a NiCr alloy which has been conventionally used for portions requiring machining.

SUMMARY OF THE INVENTION

To attain the above-described and other objects, in accordance with the present invention there is provided a spectacle frame characterized in that a shape memory alloy is used as a constituent material of face-contacting portions such as sides and lens-fixing portions such as a rim, a titanium alloy is used as a constituent material for connecting members for connecting the face-contacting portions and the lens-fixing portions, and the members are soldered with a palladium-based soldering material.

In addition, in accordance with an embodiment of the present invention, a shape memory alloy material may be used by making use of its characteristics with respect to portions for which the machining accuracy may be relatively lower, such as a lug, a pad arm, a bridge, and the like. Furthermore, a silver-palladium alloy is suitable as a palladium-based soldering material.

The above and other objects, features and advantages of the present invention will become more apparent from the following detailed description of the invention when read in conjunction with the accompanying drawings.

BRIEF DESCRIPTION OF THE DRAWINGS

FIG. 2 is a diagram illustrating the characteristics of component parts of the spectacle frame used in a combination;

DESCRIPTION OF THE PREFERRED EMBODIMENT

Figure 1:
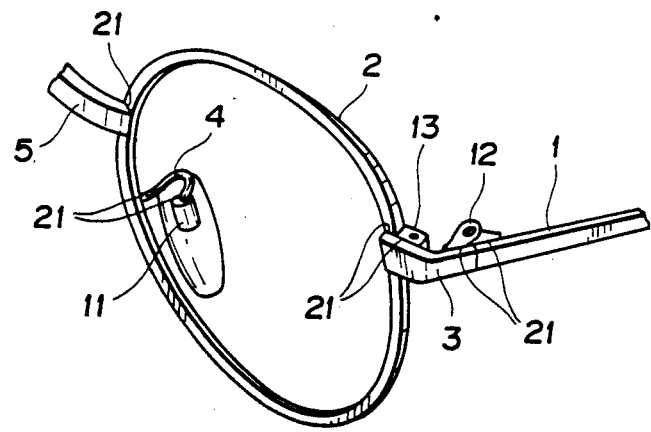
FIG. 1 is a perspective view of a part of a spectacle frame in which parts are soldered by using a soldering material in accordance with the present invention.

FIG. 1 is a perspective view of a part of a spectacle frame in accordance with the present invention. A side 1 is connected to a lug 3 via a joint 12, and the lug 3 is connected to a rim 2, which serves as a lens fixing member, via a brow lug 13. The rim 2 is connected to the other rim (not shown) via a bridge 5. In addition, the rim 2 is provided with a pad arm 4 connected with a stud case 11. These members are secured by soldering, and portions requiring soldering are denoted by reference numeral 21. In addition, the side 1, the rim 2, the lug 3, the pad arm 4, and the bridge 5 are respectively formed of an NT alloy material formed in such a manner as to retain an optimum configuration at normal temperature. The stud case 11, the joint 12, and the brow lug 13 are provided with precision machining including cutting, boring, and tapping.

In accordance with the present invention, a Ti alloy, preferably $\beta$-phase Ti alloy, is used for connecting members which require precision machining, such as the lug 13, the joint 12, and the stud case 11. In addition, a Pd-based soldering material is used for soldering portions. As a Pd-based soldering material, for instance, a silver-palladium alloy (Ag-Pd alloy) is suitably used.

Figure 4:
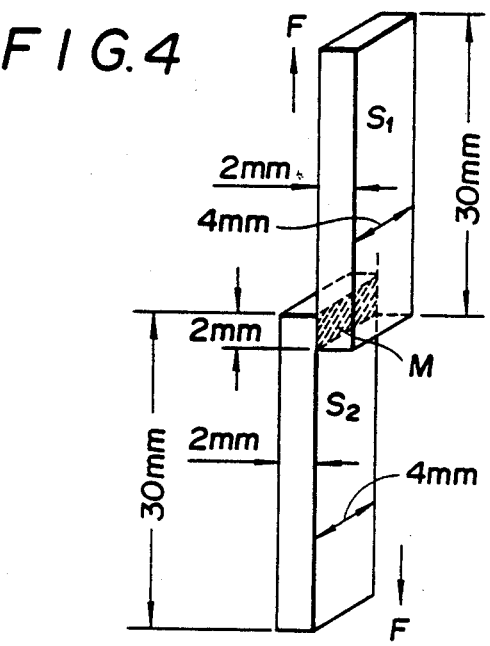
FIG. 4 is a diagram illustrating a mode of a simple test.
Figure 3:
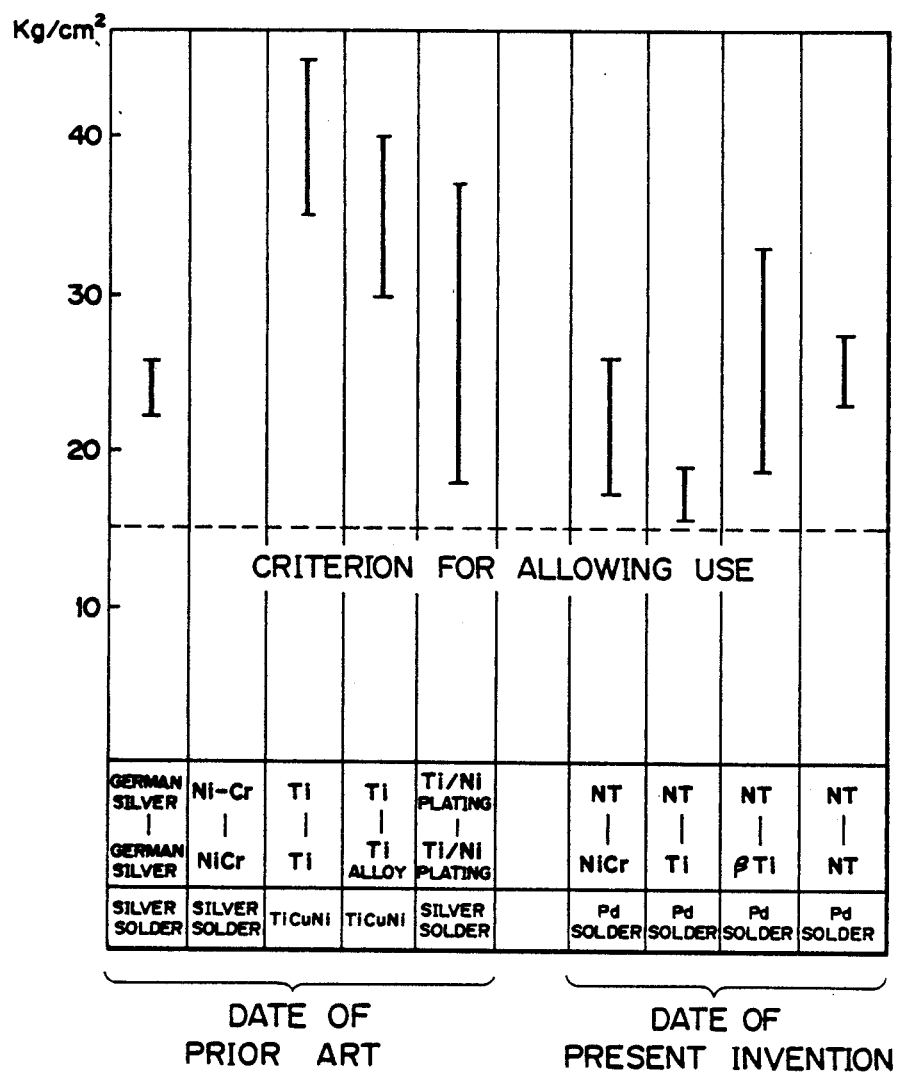
FIG. 3 is a diagram illustrating the soldering strength of various members.

FIGS. 2 to 4 illustrate the characteristics of the spectacle frame in accordance with the present invention. FIG. 2 shows, in the form of a table, the characteristics of the component parts of the spectacle frame that are used in combination. In the table shown in FIG. 2, the respective parts A are subjected to various machining processes shown in Column B, and the possible use of an NT alloy is shown in column C. In addition, column D in the table shows soldering can be performed between the members concerned and shows combinations of usable soldering materials.

FIG. 3 is a diagram illustrating the soldering strength of the members used in the present invention and those used in the prior art. In the drawing, thick bar portions are based on test results of samples in which soldering was effected in the mode shown in FIG. 4. Namely, in FIG. 4, samples $S_1$, $S_2$ to be jointed were jointed at a soldering surface M. The samples thus soldered were pulled vertically with a tensile strength F to measure the soldering strength. A tension test was conducted ten times or more for each sample, and the results are shown in FIG. 3.

The component materials and the soldering material of the present invention were selected by taking into consideration the results (shown in FIGS. 2 to 4) obtained on the basis of the aforementioned tests.

In other words, in accordance with the present invention, a shape memory alloy is used for face-contacting portions such as the sides as well as the rim so that no undue force will be applied to the lens. On the other hand, a β-phase Ti alloy is used for connecting members such as the lug, the joint, and the stud case which require precision machining such as cutting, drilling, and tapping, and a Pd-based soldering material is used for soldering portions. Therefore, it is possible to provide a spectacle frame which is sturdy, fits comfortably with the user's portion to which the spectacle frame is applied, to which no undue force is applied during fitting of the lens, and which has a unique texture.

In the foregoing, there is referred to the use of the β-phase Ti alloy as a preferred material for the connecting member. However, other Ti alloy such as α- or α+β-phase Ti alloy may be utilized. Moreover, from the view point of the soldering material, the combination to be used and connected for the spectacle frame members, NT-Cu alloy or NT-stainless steel may be utilized in place of the Ti alloy.

What is claimed is:

1. A spectacle frame comprising:
a face-contacting portion formed of a shape memory alloy; a lens-fixing portion formed of a shape memory alloy; and a connecting member formed of a β-phase titanium alloy connecting said face-contacting portion and said lens-fixing portion with each other,
said face-contacting portion and said lens-fixing portion being soldered to said connecting member with a palladium based soldering material.

2. A spectacle frame according to claim 1, wherein some parts of said connecting members are formed of said shape memory alloy.

3. A spectacle frame according to claim 1, wherein a silver-palladium alloy is used as said palladium-based soldering material.

* * * * *